R. KLEIN & T. BRUECK.
CAMERA SHUTTER.
APPLICATION FILED JUNE 25, 1910.

1,092,110.

Patented Mar. 31, 1914.
3 SHEETS—SHEET 3.

UNITED STATES PATENT OFFICE.

RUDOLPH KLEIN AND THEODOR BRUECK, OF ROCHESTER, NEW YORK, ASSIGNORS TO MORRIS ROSENBLOOM, OF ROCHESTER, NEW YORK.

CAMERA-SHUTTER.

1,092,110.  Specification of Letters Patent.  Patented Mar. 31, 1914.

Application filed June 25, 1910. Serial No. 568,926.

*To all whom it may concern:*

Be it known that we, RUDOLPH KLEIN and THEODOR BRUECK, of Rochester, in the county of Monroe and State of New York, have invented a new and useful Improvement in Camera-Shutters, which improvement is fully set forth in the following specification and shown in the accompanying drawings.

The present invention relates to camera shutters and it has for an object to provide a simple and durable construction which is automatic in its action, that is, the shutter blades are opened and closed merely by one operation of the operating mechanism.

Another object of the invention is to provide an automatic shutter which positively actuates the shutter blades in both directions.

Other objects are to improve the shutter mechanism, the operating devices for the master member, the detaining means for bulb and time exposures and the retarding means for the operating mechanism.

To these and other ends the invention consists in certain parts and combinations of parts all of which will be hereinafter described, the novel features thereof being pointed out in the appended claims.

In the present embodiment of the invention there is employed a substantially ring shaped casing 1 and an apertured partition 2 rigid with the ring 1 and so located that the latter projects from opposite sides thereof to provide two chambers 3 and 4 which respectively serve for housing the shutter mechanism and the operating mechanism for the latter. Also projecting from one side of the partition 2 about the aperture thereof is the lens barrel 2ª providing with ring 1 an annular chamber for the shutter operating mechanism. Removable closures 5 and 6 may be provided preferably separate from said mechanisms, so that when the closures are removed the operative parts of the shutter may be inspected and operated independently of the closures, thus facilitating the assembling and the repair of parts of the shutter.

The shutter mechanism, in this instance, comprises a plurality of blades 7 (preferably four) separately pivoted on pins 8 projecting from partition 2 and coöperating to close the aperture 90. These blades may be connected for simultaneous operation by two levers 9 and 10 pivoted intermediately of their ends at 11 and 12 respectively and each having pin and slot connection 13 at its ends with two of the blades 7, thus connecting the blades in pairs, the two pairs being connected together by a link 14 pivoted at its ends to the levers 9 and 10. The lever 9 may have a laterally extending finger 15 projecting through a curved slot 16 in the partition 2 so that the shutter may be controlled by an operating mechanism in the chamber 4.

Figures 5, 6, 7, 8, 9, 10, 11:
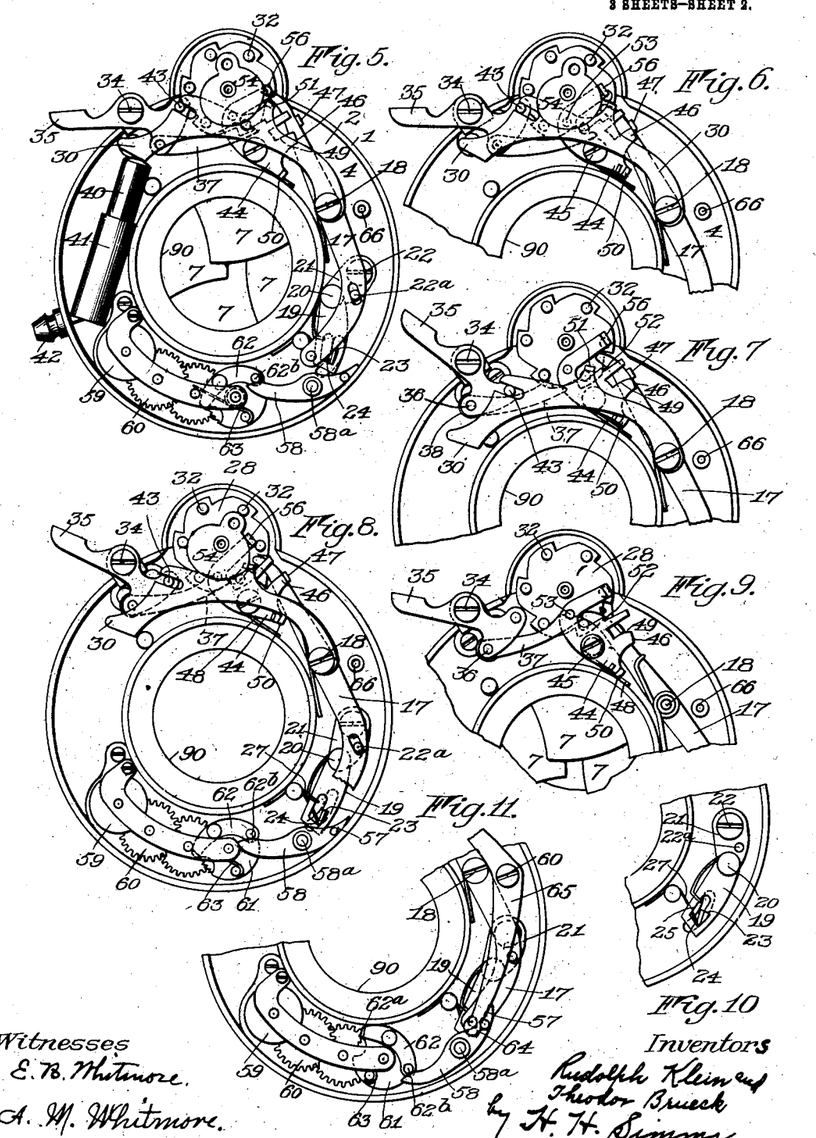
Fig. 5 is a view similar to Fig. 2 showing the setting cam in position to give instantaneous exposures, and the parts occupying positions which they take immediately on the release of the master lever by the operating devices.
Fig. 6 shows in detail the positions of the detaining member and proximate parts when the shutter is adjusted for bulb exposure and while the bulb is held with pressure.
Fig. 7 shows the engagement of the bulb-lever with the detaining member to move the latter on bulb exposure.
Fig. 8 shows the cam adjusted for time exposure with the shutter in open position.
Fig. 9 shows the position of the parts when the detaining member is shifted from stop position under the action of the dog on the operating member.
Fig. 10 is a detail view of the latch, showing the position of the latter during the closing movement.
Fig. 11 is a detail view showing the retarding means adjusted for greatest retarding action.
Figures 13, 14, 15, 16, 17, 18, 19:
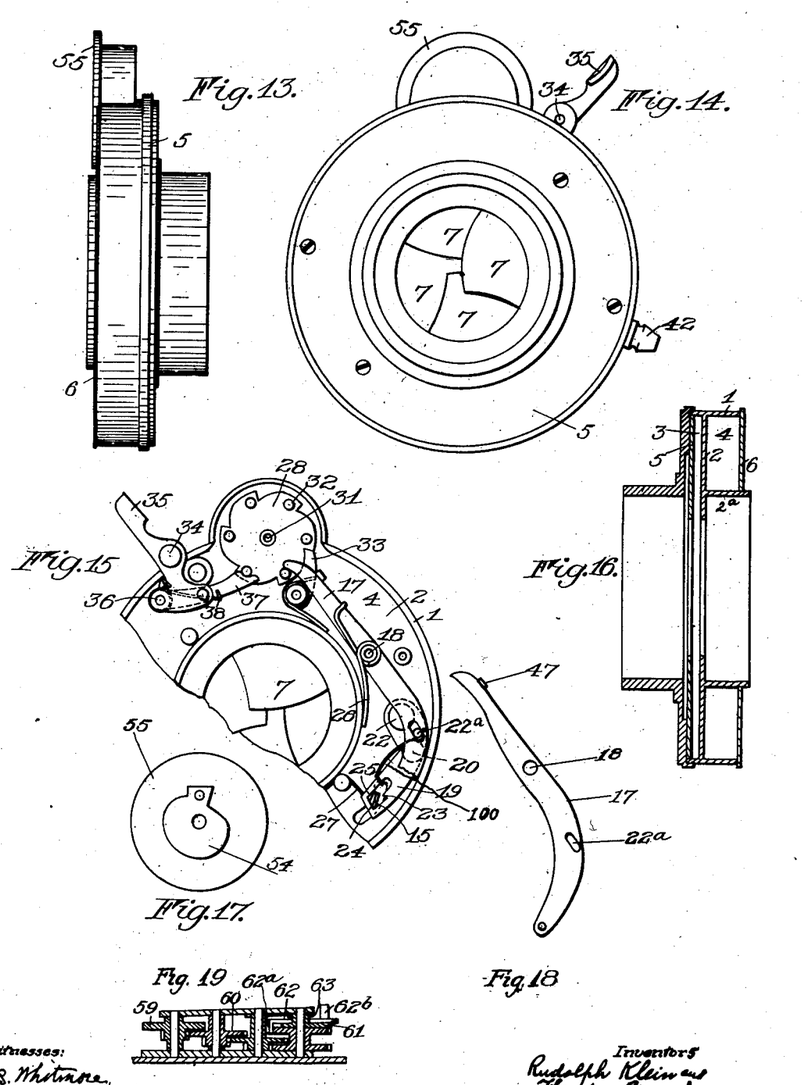
Fig. 13 is a side view of the shutter.
Fig. 14 is a rear view of the shutter.
Fig. 15 is a detail view illustrating the latch and the master member in normal positions.
Fig. 16 is a sectional view of the casing of the shutter.
Fig. 17 is a detail view of the setting cam and its disk.
Fig. 18 is a detail view of the master lever.
Fig. 19 is a sectional view of the retarding means.

The shutter mechanism above described facilitates a quick assembling of the parts with great accuracy, takes up but a very small space and is inexpensive to manufacture. It also has very little friction and is therefore very sensitive. Of course, it may be used with any operating mechanism. A desirable form of operating mechanism which may be used with or without the said shutter mechanism comprises a master member 17 preferably in the form of a lever pivoted at 18 to the partition 2 and having one end controlling the shutter mechanism and the other controlled by suitable operating devices. Preferably the master lever is employed for moving the shutter positively in both directions and, in order that this result may be accomplished with but a small movement of the master lever, a latch or dog 19 has its pivot 20 mounted independently of the master lever to swing in an arc greater than the arc in which the master lever swings. Preferably the latch is pivoted to a member or arm 21 mounted to swing about an axis 22, and moved by the master lever, having for this purpose a pin and slot connection 22ª with the lever. The latch may have a pair of shoulders 23 and 24 lying substantially parallel and adapted to coöperate with the finger 15 which is preferably flattened, a face 25 being provided on the latch to maintain the shoulders and the projection in coöperative relation. When the master member is swung against the action of its spring 26 and from the position shown in Fig. 15 by means of suitable operating devices, the latch slips over the projection 15 without shifting the latter until the position shown in Fig. 5 is reached, when the shoulder 23 is moved above and in engagement with the finger 15 so that upon the release of the master lever, the shutter blades are forced open by the spring 26 due to such engagement, the parts reaching the position shown in Fig. 8, after which the projection 15 is engaged by shoulder 24 due to the upward movement of the latch and the blades are pulled closed by the spring 26. If desired a small spring 27 may act on the projection 15 to give the shutter blades a normal tendency to remain closed, for, during the actuation of the master lever, the latch drags over the projection 15 and might operate the blades slightly. This spring should not be so strong that it will interfere with the action of the spring 26 of the master lever. A spring 100 (see Fig. 15) may also act on the latch 19 to cause the shoulder 23 to ride above the projection 15 as the master lever nears the end of its movement under the influence of the operating devices so that it will be in position to open the shutter on the return movement of the master member under the influence of spring 26.

The operating devices for the master member in this instance comprise an actuating member 28, a manually operable member 29 for moving the actuating member, and a bulb operated member 30 also for moving the actuating member.

The actuating member 28 preferably rotates in a complete circle in but one direction and may comprise a notched wheel or disk rotatable on a stud 31 and having lateral projections 32 adapted successively to engage the master lever near one end to move the latter against the action of its spring 26 and then to release said lever due to the fact that the end of the lever and the projections travel in intersecting paths. To hold the disk against rotation in the opposite direction a pivoted and spring pressed pawl 33 may coöperate with its notched periphery. The manually controlled operating member 29 is preferably in the form of a lever pivoted at 34 with one end projecting through the casing and formed with a finger piece 35. Pivoted at 36 to this lever is a dog or pawl 37 notched at one end to engage the projections 32 and held toward said projections by a spring 38. When the finger piece 35 is depressed the pawl 37 rotates the wheel 28 in a direction to shift the master lever, after which, the spring 38 tends to move the finger piece to its original position.

In order that the shutter may be operated by a bulb there may be provided a piston 40 operating in a cylinder 41 to which air is delivered by a nipple 42. The piston and its cylinder are arranged in the chamber 4 and the former engages the bulb operated member 30 which is preferably in the form of a lever pivoted, in this instance, about an axis coincident with the axis 18 of the master lever, and having a pin and slot connection 43 with the operating member 29.

The parts of the operating mechanism so far described will only effect what is termed an instantaneous exposure, and to the end of securing a bulb exposure, a detaining member 44 may be pivoted at 45 and have a single stop or shoulder 46 which moves into the path of a shoulder 47 on the master lever and prevents the closing of the shutter blades. The detaining device may have a normal tendency to move to stop position given by a spring 48 acting thereon; and so that it will not move until the master lever has reached a certain position, the master lever exercises a controlling relation thereover by engagement of shoulder 47 with a face 49 on the detaining member. The stop 46 is not engaged by the master lever immediately upon the release of the latter by the actuating member 28, as the master lever is permitted to move under the action of its spring 26 until the shutter blades are opened, when engagement with the detaining member takes place.

As long as the bulb lever is held by pressure on the bulb, the shutter blades 7 will remain open but upon the release of the pressure, connection is established between the operating devices and the detaining member 44 preferably by means of a projection 50 of the detaining member located in the path of the bulb lever 30 and engaged by the latter to shift the stop 46 of the detaining member out of the path of the master lever, freeing the latter and permitting it to close the shutter blades. For the purpose of obtaining time exposures, the stop 46 is also employed for engaging with the master lever, and the connection at 50 between the detaining member 44 and the operating device 50 is rendered inoperative by a means which prevents the return of the operating devices to their initial positions, thus maintaining the stop 46 in stop position. In this instance this means comprises a projection 51 on the bulb lever coöperating or interlocking with a shoulder 52 on the detaining member. As the operating member 29 does not return to its initial position, the dog or pawl 37 does not lie in a position to engage the next projection 32 and therefore this pawl or dog may be utilized for shifting the detaining member 44 from its stop position. To this end the detaining member 44 is provided on its rear face with a lateral projection 53 which lies directly in the path of dog 37 so that upon the operation of member 29 the detaining member 44 will be shifted from stop position.

Any suitable means may be employed for adjusting the operating mechanism to determine bulb or time exposure. In this instance a cam 54 is secured to a setting disk 55 both of which turn on the stud or post 31. This cam may coöperate with a projection 56 on the detaining member and shift the latter to any one of three operating positions, viz: instantaneous, as shown in Fig. 5, in which the master lever moves in both directions without the shoulder 47 engaging the detaining member; bulb, as shown in Figs. 6 and 7, in which the detaining member is positioned so that its shoulder 52 is not engaged by projection 51 on the bulb lever; and time, as shown in Fig. 8, in which the detaining member is positioned so that the shoulder 52 and projection 51 interlock.

Figures 1, 2, 3, 4, 12:
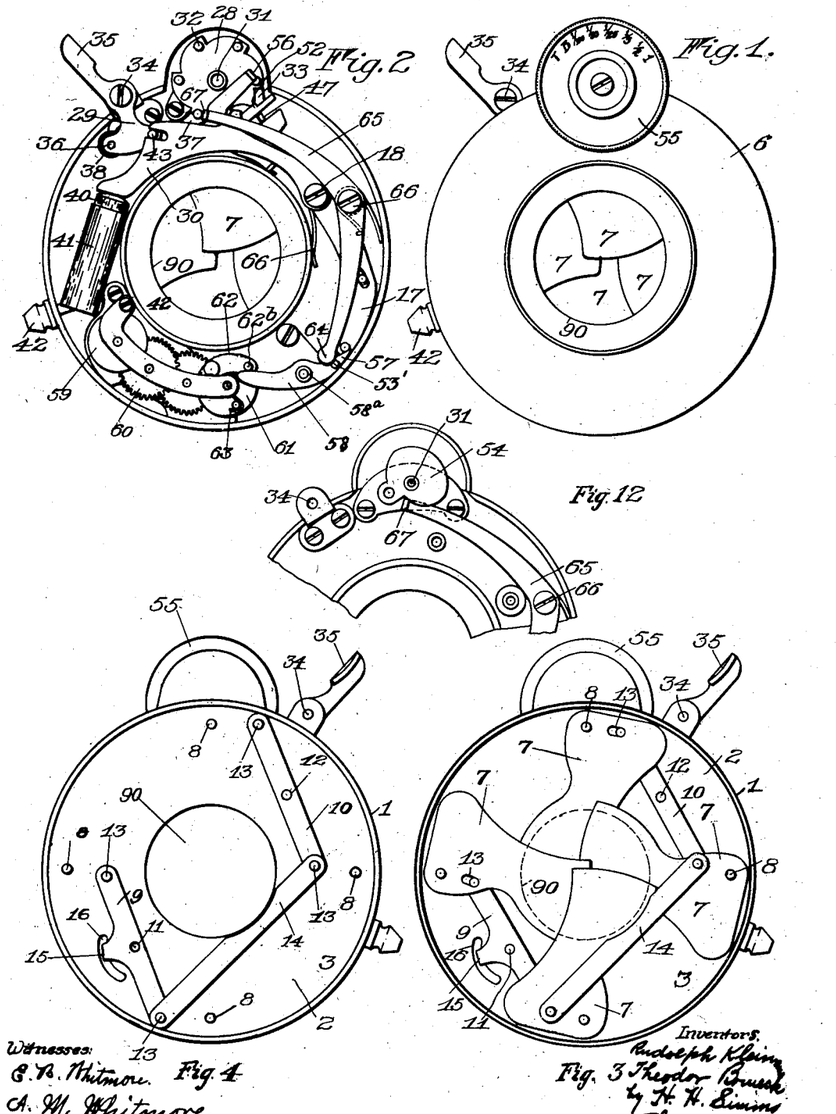
—Figure 1 is a front view of a shutter constructed in accordance with this invention.
Fig. 2 shows the front closure removed to illustrate the shutter operating mechanism, the cam which controls the detaining member being removed and the parts otherwise occupying their normal positions.
Fig. 3 shows the shutter with the rear closure removed.
Fig. 4 is a similar view showing the shutter blades removed.
Fig. 12 shows the position of the setting cam for the adjustment shown in Fig. 11.

With the object in view of retarding the operating mechanism for producing exposures of limited time there may be employed a movable stop 57 to coöperate with the master member. This stop may be arranged at one end of a lever 58 that is pivoted at 58ª between its ends in the chamber 4. The outer end of the lever 58 has a clutch connection with a retarding means preferably arranged within chamber 4 and comprising a rotatable governor 59 and a train of gearing 60, the clutch connection, in this instance, being in the form of a notched wheel 61 secured to the gearing and a member 62 having a tooth 62ª to engage the notched wheel and an end 62ᵇ slidingly coöperating with the lever 58. A spring 63 moves the member 62 in one direction independently of disk or wheel 61 to cause the member 62 to follow quickly the lever 58 without causing the retarding mechanism to move except in one direction so that it is impossible to actuate the shutter so quickly that the retarding means will be affected. For the purpose of adjusting the stop 57 relatively to the master lever and thus varying the time of the opening of the shutter, a stop 64 is provided and is preferably arranged on one end of a lever 65 which is pivoted at 66 and has its other end 67 coöperating with the cam 54. It is apparent that the stop 64 can render the stop 57 inoperative as shown in Fig. 2, give full retarding action as shown in Fig. 11 or be positioned to locate the stop 57 at any point between these limits.

The operation of the invention will be fully understood from the foregoing description but it may be summarized as follows: Instantaneous exposure is effected by adjusting the setting disk 55 so that the cam 54 lies in the position shown in Fig. 5, said cam coöperating with detaining member 44 to prevent stop 46 moving into the path of the master member 17 and also coöperating with lever 65 to hold stop 57 in the position shown in this figure. When the finger piece 35 is pressed or piston 40 moved, the dog 37 shifts the actuating wheel 28 causing master member 17 to be moved in one direction and then released to travel in the reverse direction under the action of spring 26. In moving under the action of the operating devices the master lever drags the dog 19 over projection 15 and on the first part of the return movement of the lever, the shoulder 23 engages the projection to open the shutter blades, after which, the shoulder 24 engages the projection 15 and pulls the shutter blades closed.

For bulb action the cam 54 is shifted to the position shown in Fig. 6 so that the stop 46 lies in the path of the projection 47 on the master lever and holds the latter against a complete return movement with the shutter open. Upon the release of the pressure the projection 50 on the detaining member is engaged by the bulb lever 30 and the stop 46 moved out of the path of the master lever so that the latter may move under the action of its spring and close the shutter. During this adjustment of the cam 54, the stop 57 lies so that the retarding means does not act on the master member.

For time exposure the cam 54 is adjusted to the position shown in Fig. 8 so that when the operating devices are actuated, the shoulder 52 on the detaining member moves in the path of projection 51 on the bulb lever and prevents the latter engaging the projection 50 to shift said detaining member. The dog 37 is also positioned so that upon the next actuation of the operating devices the projection 53 will be engaged by the dog and the detaining member 44 shifted from stop position.

A camera shutter constructed in accordance with this invention has its blades connected for simultaneous operation by a mechanism which is simple in construction and operation and is adapted to have its parts quickly and accurately assembled. The shutter mechanism is actuated positively in both directions by a mechanism which gives a maximum speed. The master member only makes a short movement which is amplified in the latch that coöperates with the shutter mechanism. The movement of the detaining member is simple as only one stop is provided for effecting the time and the bulb exposures, provision being made for utilizing the operating devices of the master lever to lock the detaining member in stop position when the shutter is adjusted for time exposure. The operating devices are also employed for unlocking the detaining member and are of novel construction permitting ease and quickness in action. A novel retarding means is provided which permits a movement of the master lever independently thereof so that the operating mechanism is relieved of work in setting the retarding means, while at the same time the retarding means is at all times ready for action.

What we claim as our invention and desire to secure by Letters Patent, is:

1. A camera shutter comprising a ring, an apertured partition rigidly secured within the ring so that the latter projects from one side thereof, a lens barrel rigid with the apertured partition and projecting therefrom about the aperture to form with the ring an annular chamber, a shutter operating mechanism arranged within the annular chamber on one side of the partition, a removable closure for the annular chamber entirely separate from the shutter operating mechanism, shutter mechanism mounted on the other side of the partition, and a closure for the shutter mechanism.

2. A camera shutter comprising a ring, an apertured partition rigidly secured within the ring so that the latter projects beyond both sides of the partition, a lens barrel rigid with and projecting from one side of the partition about the aperture to provide an annular chamber, a shutter operating mechanism arranged in the annular chamber, a removable closure for the operating mechanism separate from said shutter operating mechanism, shutter mechanism supported on the other side of the partition, and a removable closure for the shutter mechanism separate from the shutter mechanism.

3. In a camera shutter, the combination of a shutter mechanism comprising a plurality of shutter blades, levers pivoted between their ends to a fixed part of the shutter and connected on opposite sides of their pivots to different blades, and a link connecting the levers, with shutter operating mechanism connected to one of the levers.

4. In a camera shutter, the combination of a shutter mechanism comprising a plurality of pivoted blades, levers pivoted between their ends to a fixed part of the shutter, pin and slot connections between each lever and a pair of blades on opposite sides of the pivot of the lever, and a link connecting the levers, with a shutter operating mechanism operatively connected to one of the levers.

5. In a camera shutter, the combination with a casing having an apertured partition, of shutter blades pivoted on one side of the partition, an operating lever for said blades having a projection extending through the casing partition, a latch arranged on the opposite side of the partition and coöperating with the projection on the lever, and a master lever for actuating the latch.

6. In a camera shutter, the combination with a shutter mechanism, of controlling mechanism comprising a master lever, and a latch for actuating the shutter mechanism pivoted independently of the master lever and having a movable pivot shiftable by said lever in a greater arc of a circle than is made by any portion of the master lever in its movement, and means for supporting the pivot of the latch in order that the pivot may partake of the before mentioned movement.

7. In a camera shutter, the combination with a shutter mechanism, of controlling mechanism therefor comprising a master lever, a swinging member moved by the master lever and a latch pivoted to the swinging member and engaging the shutter mechanism to actuate the same.

8. In a camera shutter, the combination with the shutter mechanism, of operating mechanism for the shutter mechanism embodying a master member, and a latch interposed between the master member and the shutter mechanism, said latch having a connection with the shutter mechanism which permits the latch to slip past the shutter mechanism when the master member is moved in one direction and to engage and positively open and then positively close the shutter mechanism on the movement of the master member in the other direction.

9. In a camera shutter, the combination with a shutter mechanism, of a controlling mechanism therefor comprising a master member, a swinging member moved by the master member, and a latch pivoted on the swinging member and eccentrically to the axis of the latter and having a portion coöperating with the shutter mechanism to open the latter and a portion coöperating with the said shutter mechanism to close the same.

10. In a camera shutter, the combination with a shutter mechanism, of controlling ver, a spring moving the same in one direction, an actuating member coöperating with the master lever to move it against the action of the spring and then automatically release said lever, a swinging member moved by the master lever in both directions, and a latch pivoted on the swinging member eccentrically to the axis of the latter and having a portion coöperating with the shutter mechanism to open the shutter and a portion coöperating with the shutter mechanism to close the shutter.

11. In a camera shutter, the combination with a shutter mechanism, of controlling means therefor comprising a master member, a spring for moving said member in one direction, an actuating member for the master member moving the latter against the action of the spring, and a latch pivotally mounted independently of the master lever and controlled by the latter, said latch having a shoulder to coöperate with the shutter mechanism to open the same and a shoulder to coöperate with the shutter mechanism to close the same.

12. In a camera shutter, the combination with a shutter mechanism, of controlling mechanism therefor comprising a pivoted master lever, a swinging member, a pin and slot connection between the swinging member and the master lever and a latch coöperating with the shutter mechanism and pivoted on the swinging member and eccentrically to the axis of the latter.

13. In a camera shutter, the combination with a shutter mechanism having a light spring to maintain it normally closed, of a master lever, a stronger spring for moving the latter in one direction, operating devices for the master lever moving the latter in the other direction against the action of the second named spring and automatically releasing said lever at the end of such movement, and a latch operated by the master lever and coöperating with the shutter mechanism, said latch having a lost motion connection with the shutter mechanism permitting its movement relatively to the shutter mechanism when the master lever is moved by the operating devices and engaging with and positively actuating the shutter mechanism during the opening and the closing movement of the latter.

14. In a camera shutter, the combination with a shutter mechanism, of an operating mechanism for the same, embodying a master member for actuating the shutter mechanism having a lost-motion connection with the shutter mechanism permitting the master member to move in one direction without actuating the shutter mechanism, and an actuating member rotatable in a complete circle and engaging the master member for moving said master member without actuating the shutter mechanism.

15. In a camera shutter, the combination with a shutter mechanism, of a master member for controlling the same, and a rotary actuating member having a plurality of laterally extending operating projections to successively engage the master member.

16. In a camera shutter, the combination with a shutter mechanism, of a pivoted master member and a rotary actuating member having a plurality of laterally extending operating projections successively coöperating with the pivoted master member and then movable to free the latter.

17. In a camera shutter, the combination with a shutter mechanism, of an operating mechanism therefor comprising a master lever, a rotary actuating member provided with projections coöperating with the master member, a device for preventing the rotation of the actuating device in one direction, and a pivoted operating member for the actuating device having a dog pivoted thereon and adapted to engage the projections of the actuating device.

18. In a camera shutter, the combination with a shutter mechanism, of an operating mechanism therefor comprising a master member, a detaining member having a stop thereon movable into the path of the master member, said detaining member also having a portion engaging the master member to prevent the movement of the stop into the path of the said master member until the latter reaches a certain position, and means tending to move said detaining member so that the stop thereof lies in the path of the master member.

19. In a camera shutter, the combination with a shutter mechanism, of an operating mechanism therefor comprising a master member, a detaining member for the master member having a single stop for bulb and for time exposures, means for determining the position of the detaining member for bulb or time exposure, operating devices for the master member having connection with the detaining member for moving the latter from stop position when said operating devices are released, and means for rendering such connection inoperative when the shutter is adjusted for time exposure.

20. In a camera shutter, the combination with a shutter mechanism, of an operating mechanism for the shutter mechanism comprising a master member, operating devices for the master member, a detaining member having a stop movable into the path of the master member, means tending to move the detaining member to stop position, means connecting the master member and the detaining member and preventing such movement until the master member reaches a certain position, and connection between the operating devices and the detaining member for moving the detaining member from stop position.

21. In a camera shutter, the combination with a shutter mechanism, of operating mechanism therefor comprising a master member, a detaining member for the master member having a tendency to move to stop position and provided with a single stop for bulb and time exposures, means for determining bulb or time exposures, operating devices for the master member having connection with the detaining member to move the latter from stop position when the operating devices are released, and means rendering such connection inoperative when the shutter is adjusted for time exposures.

22. In a camera shutter, the combination with a shutter mechanism, of operating mechanism therefor comprising a master member, a detaining member for the master member having a single stop for bulb and for time exposures, means tending to move said stop to stop position, means coöperating with the detaining member to determine the time or the bulb exposure, operating devices for the master member having connection with the detaining member to move the latter from stop position when the operating devices are released, and means rendering such connection inoperative when the shutter is adjusted for time exposure.

23. In a camera shutter, the combination with a shutter mechanism, of operating mechanism therefor comprising a master member, a detaining member for the master member having a single stop for time and bulb exposures means giving the detaining member a tendency to move to stop position, a device coöperating with the detaining member for determining the time or the bulb exposure, operating devices for the master member having connection with the detaining member to move the latter from stop position upon the release of the operating devices, means rendering such connection inoperative when the shutter is adjusted for time exposure, and means causing said operating devices to move the detaining member from stopping position on their next operation.

24. In a camera shutter, the combination with a shutter mechanism, of operating mechanism therefor comprising a master member, a detaining member having a single stop for bulb and time exposures, means for determining the position of the detaining member for time or bulb exposures, a member engaging said detaining member to move it from stop position, and coöperating portions on said member and the detaining member interlocking when the detaining member is adjusted for time exposure.

25. In a camera shutter, the combination with a shutter mechanism, of operating mechanism therefor comprising a master member, a detaining member coöperating with the master member for time and bulb exposures, a bulb lever engaging said detaining member to move the latter from stop position, means for determining the position of the detaining member for bulb or time exposure, and coöperating portions on the bulb lever and the detaining member interlocking when the detaining member is adjusted for time exposure.

26. In a camera shutter, the combination with a shutter mechanism, of an operating mechanism therefor, comprising a master member, a pivoted detaining member movable into the path of the master member for bulb and time exposures, a pivoted lever engaging said detaining member on one side of its pivot to move it from stop position, and coöperating portions on the said lever and the detaining member on the other side of the pivot of the latter interlocking when the detaining member is adjusted for time exposure.

27. In a camera shutter, the combination with a shutter mechanism, of operating mechanism therefor comprising a master member, a pivoted detaining member for the master member, means determining the position of the latter for bulb or time exposures, operating devices for the master member embodying a pivoted lever engaging the detaining member on one side of its pivot to move it from stop position, and coöperating portions on the lever and the detaining member interlocking when the latter is adjusted for time exposure, the operating devices having provision separate from the lever for disengaging said interlocking portions.

28. In a camera shutter, the combination with a shutter mechanism, of a detaining member for holding the shutter mechanism open having a single stop for time and bulb exposure, means controlling the detaining member for obtaining time or bulb exposure, and operating devices for the shutter said operating devices shifting the detaining member away from detaining position.

29. In a camera shutter, the combination with a shutter mechanism, of a detaining member for holding the shutter mechanism open having a single stop for time and bulb exposures, means normally tending to move the detaining member to detaining position, operating devices for effecting the opening of the shutter when moved in one direction and connected to the detaining member to shift it from detaining position when moved in the other direction, a locking device for preventing the return of said operating devices to initial position, means for establishing connection between the operating devices and the detaining member to shift the latter from detaining position when the operating devices are so locked, and means for controlling the locking device for time or bulb exposure.

30. In a camera shutter, the combination with a shutter mechanism, of a master member having a connection with the shutter mechanism which permits the master member to move in one direction without actuating the shutter mechanism and to move in the other direction to effect the opening and the closing of the shutter mechanism, operating devices for effecting the movement of the master member in the first mentioned direction, a single detaining member for bulb and time exposures, holding the shutter mechanism open after the master member has moved to open the said mechanism, means preventing the operating devices returning to their initial positions when the detaining member is holding the shutter mechanism open, and means connecting the operating devices and the detaining member upon the operation of the operating devices from the second position to shift the detaining member.

31. In a camera shutter, the combination with a shutter mechanism, of a master member, for operating the shutter mechanism, a detaining member for holding the shutter mechanism open, means normally tending to move the detaining member to detaining position, an operating member for the master member, and a bulb lever connected to the operating member and to the detaining member to shift the latter from detaining position.

32. In a camera shutter, the combination with a shutter mechanism and a master member for controlling the same, of a detaining member for holding the shutter mechanism open for bulb and time exposure, and a lever having a portion to coöperate with the detaining member for shifting the latter from detaining position and a portion for coöperating with the detaining member to prevent such shifting.

33. In a camera shutter, the combination with a shutter mechanism, of operating mechanism therefor, a detaining member for holding the shutter mechanism open having a single stop for bulb and time exposures, and means for locking said stop in stop position when the shutter is adjusted for time exposure.

34. In a camera shutter, the combination with a shutter mechanism, of operating mechanism therefor, a detaining member for holding the shutter open having a single stop for bulb and time exposures, and means controlling said detaining member to determine bulb or time exposure.

35. In a camera shutter, the combination with a shutter mechanism, of operating mechanism therefor embodying a master member, a detaining member for the master member having a single stop for bulb and time exposures, and means for locking said stop in stop position when the shutter is adjusted for time exposure.

36. In a camera shutter, the combination with a shutter mechanism, of operating mechanism therefor, a detaining member for holding the shutter mechanism open having a single stop for bulb and time exposures, means for determining the position of the detaining member for bulb or time exposure, and means for locking said stop in stop position when said detaining member is adjusted for time exposure.

37. In a camera shutter, the combination with a shutter mechanism, of a detaining member for holding the shutter open having a single stop for bulb and time exposures, means for determining the position of the detaining member for bulb or time exposure, locking means controlled by said determining means for holding the detaining member in stop position when the detaining means is adjusted for time exposure, and operating devices for the shutter mechanism adapted to unlock the detaining member.

38. In a camera shutter, the combination with a shutter mechanism, of a detaining member for holding the shutter mechanism open having a single stop for bulb and time exposures, locking means for holding said detaining member in stop position during time exposure, and operating devices for the shutter mechanism controlling the locking and the unlocking of said locking means.

39. In a camera shutter, the combination with a shutter mechanism, of operating mechanism therefor embodying a master member, an actuating member, an operating member for the actuating member, the last two named parts being mounted independently of each other, a detaining member movable to stop the master member after its release by the actuating member, and means controlled by the detaining member to cause the operating member to be positioned to actuate the detaining member on its next operation.

40. In a camera shutter, the combination with a shutter mechanism, of operating mechanism therefor embodying a master member, an actuating member therefor, an operating member having a movable dog to operate the actuating member, a detaining member arranged to stop the master member after its release by the actuating member, and means controlled by said detaining member for causing the dog of the operating member to be positioned to operate the detaining member on its next operation.

41. In a camera shutter, the combination with a shutter mechanism, of operating mechanism therefor embodying a master lever, an actuating member rotatable in a complete circle to operate the master lever, an operating member having a pivoted dog to coöperate with the actuating member, a detaining member movable to stop the master lever after its release by the actuating member, and means controlled by the detaining member for causing the dog of the operating member to be positioned to operate the detaining member after it has operated the actuating member.

42. In a camera shutter, the combination with a shutter mechanism, of operating mechanism therefor embodying a master lever, a rotary actuating member having a plurality of lateral projections thereon arranged successively to coöperate with the master lever, a device for preventing the rotation of the actuating device in one direction, a pivoted operating member having a dog pivoted thereon to engage the lateral projections of the actuating member, a detaining member movable into the path of the master lever when the latter is released by the actuating member, and means causing the dog to move into coöperative relation with the detaining member after the operation of the actuating member.

43. In a camera shutter, the combination with a shutter mechanism, of operating mechanism therefor comprising a master member, an actuating member therefor, an operating member having a dog adapted to operate the actuating member, a detaining member adapted to stop the master member after its release by the actuating member and provided with a shoulder, and means coöperating with the operating member and with the shoulder, when the detaining member stops the master member, in order to position the dog so that the latter may shift the detaining member out of the path of the master member.

44. In a camera shutter, the combination with a shutter mechanism, of operating mechanism therefor comprising a master member, an actuating member therefor, an operating member for the latter having a dog thereon adapted to operate the actuating member, a detaining member adapted to stop the master member after its release by the actuating member and provided with a shoulder, and a lever having pin and slot connection with the operating member and a shoulder to engage the shoulder on the detaining member when the latter is shifted to stop the master member.

45. In a camera shutter, the combination with a shutter mechanism, of operating mechanism therefor, embodying a master member, a pivoted detaining member movable into the path of the master member for time and bulb exposures, a bulb lever coöperating with the detaining member on one side of the pivot of the latter, means for determining the position of the detaining member for bulb or time exposure, coöperating portions on the bulb lever and the detaining member interlocking when the latter is adjusted for time exposure, and an operating member for the master member connected to the bulb lever and set by the latter to shift the detaining member when the said detaining member is interlocked with the bulb lever.

46. In a camera shutter the combination with a shutter mechanism, of operating mechanism therefor comprising a master lever, a rotary actuating member having a plurality of laterally extending projections for engaging the master lever, a pivoted operating lever having a dog pivoted thereon and engaging the projections on the actuating member, a pivoted detaining member having a single stop thereon for bulb and time exposures, means tending to move the stop into the path of the master lever, means on the detaining member preventing such movement until the master lever reaches a certain position under the action of the actuating member, a pivoted bulb lever connected to the operating lever, means connecting the bulb lever and the detaining member and causing the latter to be moved from stop position on the release of the bulb lever, a cam coöperating with the detaining member to determine bulb or time exposure, a shoulder on the detaining member coöperating with the bulb lever to maintain the stop of the detaining member in engagement with the master lever, and means on the detaining member adapted to be engaged by the pivoted dog of the operating member so that the latter may shift the detaining member from stop position.

47. In a camera shutter, the combination with a shutter mechanism, and operating mechanism therefor, of a retarding mechanism and a clutch interposed between the retarding mechanism and the operating mechanism.

48. In a camera shutter, the combination with a shutter mechanism and an operating mechanism therefor of a retarding mechanism for the shutter movable in one direction only, and a clutch interposed between the retarding mechanism and the operating mechanism.

49. In a camera shutter, the combination with a shutter mechanism and an operating mechanism therefor embodying a master member, operating devices for moving the master member in one direction, and a spring for moving the master member in the other direction, of retarding means for said master member movable only in one direction, and a clutch between the master member and the retarding means permitting the master member to move under the action of its operating devices without moving the retarding means.

50. In a camera shutter, the combination with a shutter mechanism and operating mechanism therefor, of a controllable stop for the operating mechanism, retarding means, and a clutch between said stop and the retarding means.

51. In a camera shutter, the combination with a shutter mechanism and operating mechanism therefor, of a controllable stop for the operating mechanism, retarding means, a clutch between the stop and the retarding means, and a spring for moving the stop independently of the retarding means in a direction opposite to that in which it is moved by the operating mechanism.

52. In a camera shutter, the combination with a shutter mechanism, and operating mechanism therefor, of a stop for the operating means, a retarding mechanism a clutch between the stop and the retarding means, a spring for moving said stop independently of the retarding means in a direction opposed to that in which it is moved by the operating mechanism, and means for determining the distance the stop will move under the action of the spring to vary the retarding action.

53. In a camera shutter, the combination with a shutter mechanism and operating mechanism therefor, of a stop for the operating mechanism, a series of retarding wheels, a clutch connection between the wheels and the stop, a spring moving said stop independently of the retarding wheels, and means for determining the position the stop shall move under the action of the spring.

54. In a camera shutter, the combination with a shutter mechanism and operating mechanism therefor comprising a master member, a spring for moving the latter in one direction and operating devices for moving it in the other direction, of a stop for the master member, a lever by which the stop is carried, a swinging member, a spring pressed pawl pivoted to the swinging member and engaging the stop carrying lever, a ratchet wheel engaged by the pawl, and retarding means connected to said ratchet wheel.

55. In a camera shutter, the combination with a shutter mechanism, of a retarding mechanism, a stop having connection with the retarding mechanism and moving with the latter in one direction, a spring for moving the stop in the other direction, said stop being adapted to coöperate with the shutter mechanism to retard the action of the latter, and means to coöperate with the stop to vary the action of the shutter mechanism on the retarding mechanism.

56. In a camera shutter, the combination with a shutter mechanism, of a master lever having connection with the shutter mechanism to move in one direction without operating the latter and in the other direction to open and to close shutter mechanism, a retarding mechanism, a stop having connection with the retarding mechanism to move in one direction therewith and during such movement being arranged to control the movement of the master member as the latter moves to close the shutter mechanism, means causing the stop to move in the other direction, and means for controlling the return movement of the stop under such means to vary the retarding action.

57. In a camera shutter, the combination with a shutter mechanism, of a master member having connection with the shutter mechanism to move in one direction without operating the latter and to move in the other direction to open and close the said shutter mechanism, a retarding mechanism, a stop independent of the master lever having connection with the retarding mechanism to move in one direction therewith and arranged to retard the action of the master lever on the movement of the latter to close the shutter, a spring acting to cause the stop to follow the master lever in the other direction, and means for controlling the return position of the stop under the action of the spring to vary the retarding action.

58. In a camera shutter, the combination with a shutter mechanism and a master member for controlling the same, of a detaining member for holding the shutter mechanism open, an actuating member for the master member adapted to shift the detaining member from detaining position, and a bulb lever for moving the actuating member having a portion coöperating with the detaining member for holding the latter in detaining position.

59. In a camera shutter, the combination with a shutter mechanism, and a master member connected thereto to open and close the shutter by a movement in one direction, of a detaining member for holding the shutter open, and operating devices having one movement to effect the movement of the master member for engagement by the detaining member, and another movement for shifting the detaining member, said operating devices having a pivoted latch for engaging the detaining member on the second movement.

60. In a photographic shutter, the combination with shutter blades and a master member having a lost motion connection with the shutter blades permitting said master lever to move in one direction without actuating the shutter blades and in the other direction to effect the opening and the closing of the shutter blades, of a retarding mechanism embodying a train of wheels and an oscillatory member having a portion thereon adapted to be engaged by the master member to be moved by the latter in moving to effect the opening and the closing of the shutter, said oscillatory member having connection with the train of wheels causing the latter to move with the oscillatory member when the said member is moved by the master member, a spring for causing the oscillatory member to move in the other direction as the master member is moved without actuating the shutter blades, and means for varying the amount of movement of said oscillatory member under the action of the spring to vary the retarding action.

In witness whereof, we have hereunto set our hands this 22nd day of June, 1910, in the presence of two subscribing witnesses.

RUDOLPH KLEIN.
THEODOR BRUECK.

Witnesses:
H. H. SIMMS,
A. M. WHITMORE.